United States Patent [19]
Finn et al.

[11] Patent Number: 5,826,032
[45] Date of Patent: Oct. 20, 1998

[54] METHOD AND NETWORK INTERFACE LOGIC FOR PROVIDING EMBEDDED CHECKSUMS

[75] Inventors: Gregory G. Finn, Mar Vista; Steven M. Hotz, Playa del Rey; Craig M. Rogers, Los Angeles, all of Calif.

[73] Assignee: University of Southern California, Los Angeles, Calif.

[21] Appl. No.: 600,231

[22] Filed: Feb. 12, 1996

[51] Int. Cl.⁶ ....................................... G06F 11/08
[52] U.S. Cl. ............... 395/200.66; 395/182.02; 395/182.04; 371/53
[58] Field of Search ............ 395/200.66, 200.67, 395/182.02, 182.04, 185.05; 370/429; 371/53

[56] References Cited

U.S. PATENT DOCUMENTS

| | | | |
|---|---|---|---|
| 4,168,469 | 9/1979 | Parikh et al. | 375/365 |
| 5,058,110 | 10/1991 | Beach et al. | 370/85.6 |
| 5,150,368 | 9/1992 | Autruong et al. | 371/31 |
| 5,430,842 | 7/1995 | Thompson et al. | 395/200.66 |
| 5,491,802 | 2/1996 | Thompson et al. | 395/200.66 |
| 5,541,920 | 7/1996 | Angle et al. | 370/429 |

FOREIGN PATENT DOCUMENTS

| | | |
|---|---|---|
| 0572145A2 | 12/1993 | European Pat. Off. . |
| 0572146A2 | 12/1993 | European Pat. Off. . |
| 0574140A1 | 12/1993 | European Pat. Off. . |

OTHER PUBLICATIONS

Boden et al., "Myrinet: A Gigabit–per–Second Local Area Network," IEEE, Feb. 1995, pp. 29–36.
Braden et al., "Computing the Internet Checksum," Network Working Group, Sep. 1988, pp. 1–12.
Bridges et al., "TCP Embedded Trailer Checksum," Dec. 1994, pp. 1–16.
Deering et al., "Internet Protocol, Version 6 (PIv6) Specification," Jun. 1995, pp. 1–31.
Koufopavlou et al., "Analysis of TCP/IP for High Performance Parallel Implementations," Mar. 1992, pp. 576–585.
Partridge et al., "Technical Criteria for Choosing IP The Next Generation (IPng)," Network Working Group, Dec. 1994, pp. 1–31.
Postel, "RFC 768: User Datagram Protocol," Aug. 1980, pp. 1–3.
Postel (ed.), "RFC 791: Internet Protocol," pp. 1–45.
Postel (ed.), "RFC 793: Transmission Control Protocol," pp. 1–85.
Rijsinghani, "Computation of the Internet Checksum via Incremental Update," Network Working Group, May 1994, pp. 1–6.
Siegel, "Overcoming Bottlenecks in High–Speed Transport Systems," IEEE, Mar. 1991, pp. 399–407.

(List continued on next page.)

Primary Examiner—Larry D. Donaghue
Assistant Examiner—Walter D. Davis, Jr.
Attorney, Agent, or Firm—Christie, Parker & Hale, LLP

[57] ABSTRACT

A method and network interface logic for providing an embedded checksum in a packet transferred over a packet network. The packet network comprises a plurality of interconnected, directly-attached computers operative to provide data fidelity between any neighboring pair of such computers at least as robust as such data fidelity between any non-neighboring pair of such computers. Each computer comprises packet storage means and network interface means. Such a packet is sent directly onto the packet network from the packet storage means of a source computer using its network interface means. The packet is received from the packet network and transferred directly into the packet storage means of a sibling computer using its network interface means. Such an embedded checksum is associated with the packet at the sibling computer with the embedded checksum being calculated by at least one of the source computer or the sibling computer based on substantially the entire packet for validating error-free receipt.

18 Claims, 10 Drawing Sheets

OTHER PUBLICATIONS

Steenkiste, "A Systematic Approach to Host Interface Design for High–Speed Networks," IEEE, Mar. 1994, pp. 47–57.

Tanenbaum, "Computer Networks," Prentice–Hall 1981, pp. 15–21.

Weaver, "Making Transport Protocols Fast," IEEE, Mar. 1991, pp. 295–300.

Whaley, "The Xpress Transfer Protocol," IEEE, Jun. 1989, pp. 408–414.

Williamson et al., "An Overview of the VMTP Transport Protocol," IEEE, Jun. 1989, pp. 415–420.

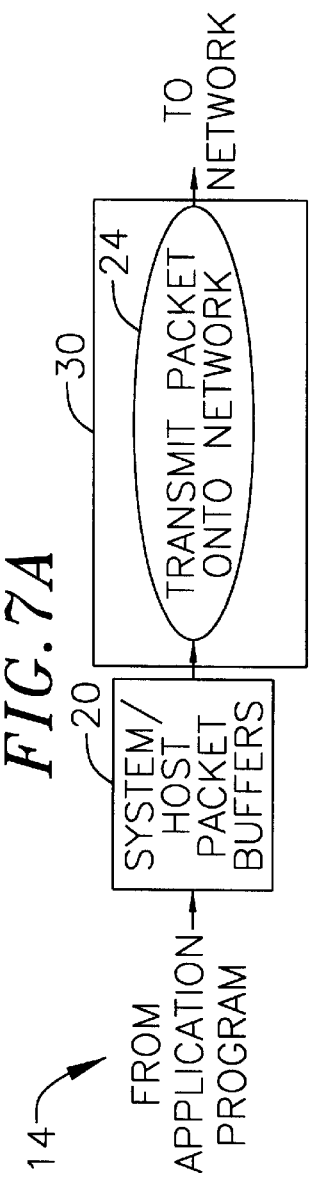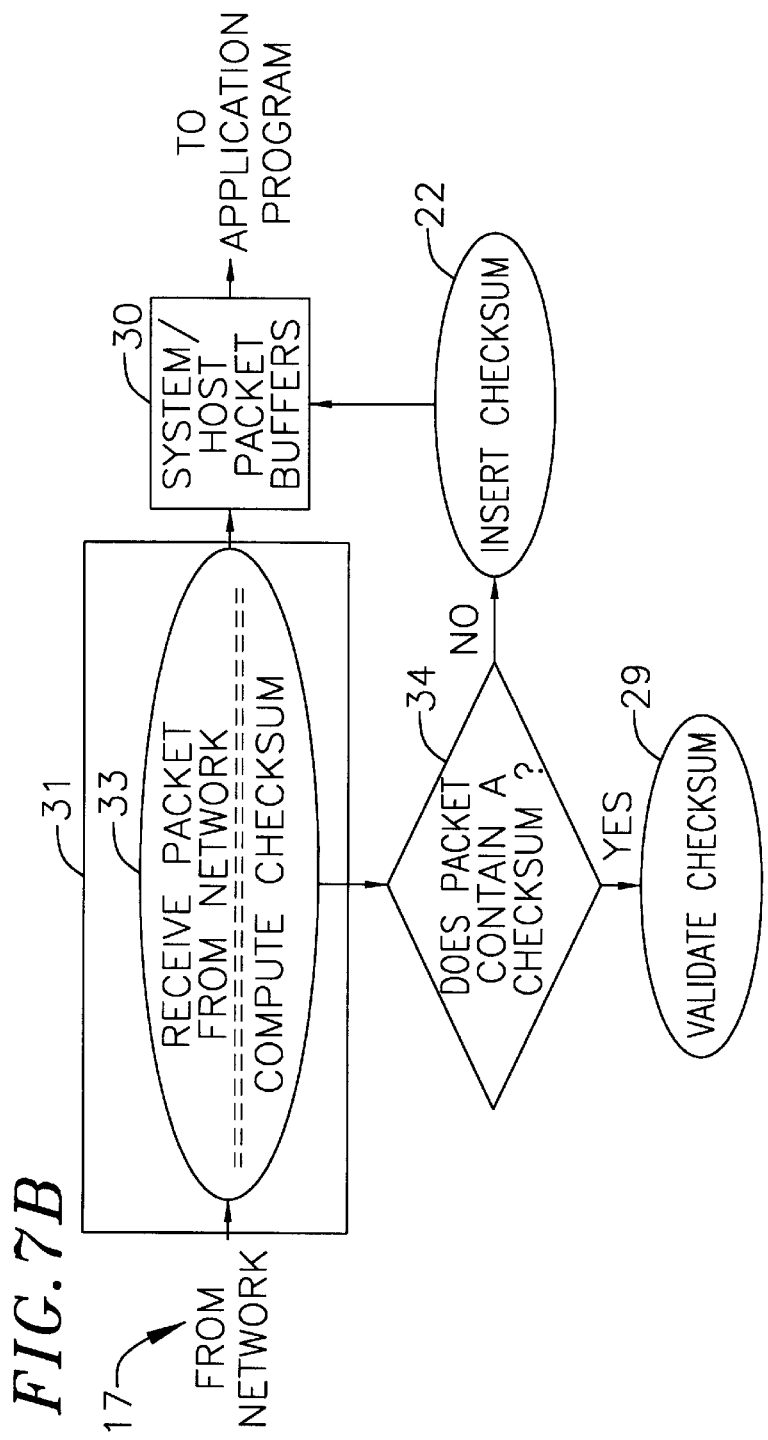

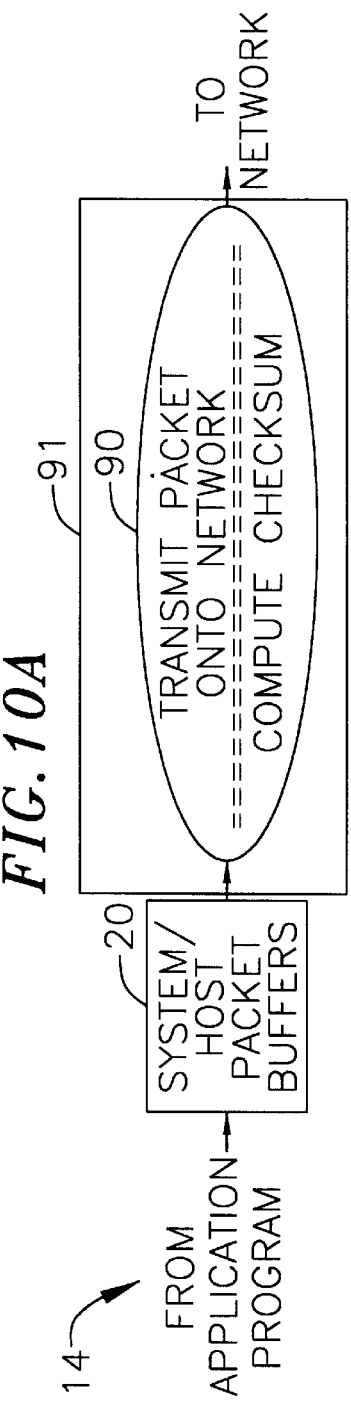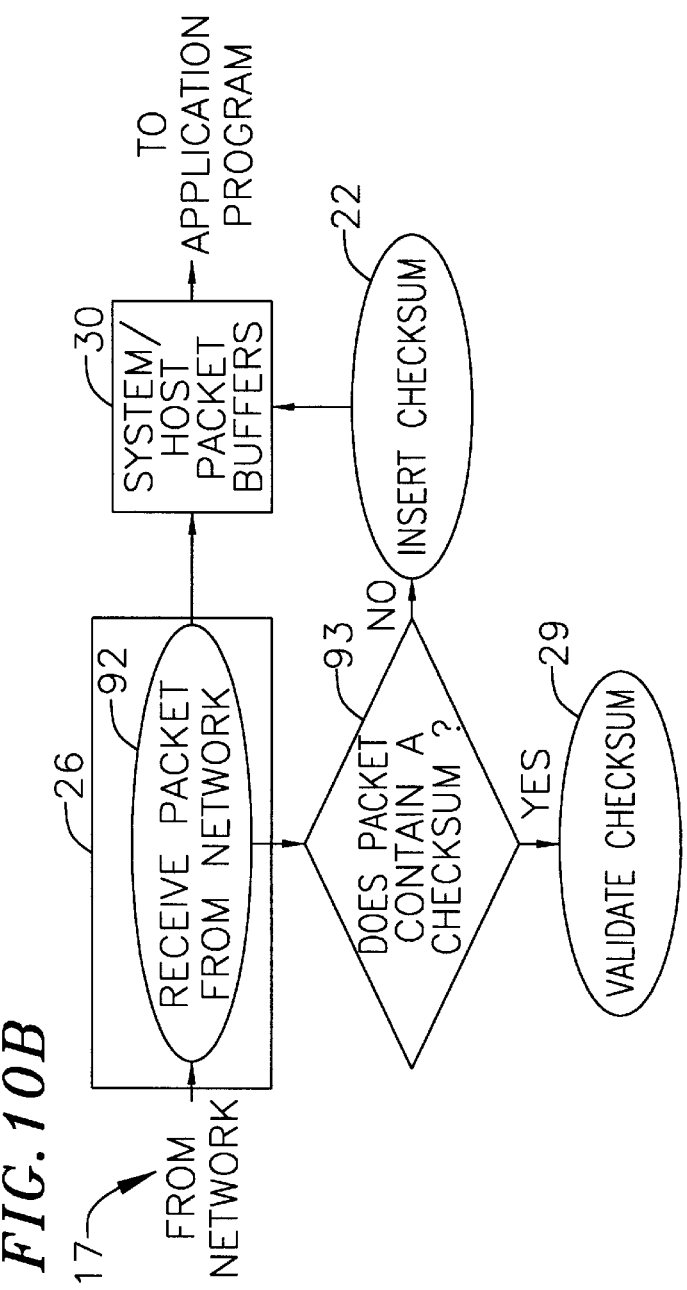

METHOD AND NETWORK INTERFACE LOGIC FOR PROVIDING EMBEDDED CHECKSUMS

This invention was made with government support under Contract No. DABT63-93-C-0062 awarded by the Department of Defense, Advanced Research Projects Agency. The government has certain rights in this invention.

FIELD OF THE INVENTION

The present invention relates to a method and network interface logic for providing embedded checksums and, more specifically, to a method and network interface logic for providing embedded checksums with zero passes through each packet.

BACKGROUND OF THE INVENTION

As the throughput of computer networks approach gigabit (Gbit/sec) and higher channel speeds, a need has arisen to improve computer system performance by reducing network protocol processing overhead.

Network protocol processing overhead can be classified as either per-packet or per-byte overhead. Per-packet overhead requires some number of operations to be performed for every packet. Conversely, per-byte overhead requires some number of operations to be performed for every byte (or for significant portions of the bytes) comprising each packet. Generally, per-byte overhead increases with the size of the packet payload (the data being transferred) while per-packet overhead remains relatively constant and can be amortized over a large number of payload bytes to lower overhead costs. As referred to herein, the term "pass" refers to a pass through the data to indicate that the overhead of a distinct per-byte operation was incurred to perform a particular function.

One significant source of per-byte protocol overhead is the calculation and validation of end-to-end checksums (known as "checksumming") used for detecting errors encountered during the transmission of data packets. This problem is discussed in P. A. Steenkiste, *A Systematic Approach to Host Interface Design for High-Speed Networks*, IEEE Computer, pp. 47–57 (Mar. 19, 1994), the disclosure of which is incorporated herein by reference. Every checksumming operation involves a byte-by-byte evaluation of every bit contained in a packet. An end-to-end checksum must typically be calculated by both the source and the destination network nodes. If the checksum calculated by the destination node differs from the checksum calculated by the source node, the packet is deemed invalid and improperly received.

Another significant source of protocol processing overhead is the determination of the checksum field's location within a packet. Although a secondary concern with respect to protocol processing, mechanisms for efficiently locating, manipulating and determining the status of the checksum field are important to reducing overall network protocol processing overhead.

Finally, system processing costs associated with the invocation, initiation and context changes required for each distinct set of per-byte operation can adversely contribute to protocol processing overhead. Thus, total overhead can be reduced by performing multiple per-byte operations in a single pass through the data.

As referred to herein, the term "zero-pass checksum" refers to a technique where no distinct per-byte read and/or write operation is required to compute a packet checksum.

Conventional checksumming generally requires a processor at a source node to perform at least two passes through the entire packet before transmitting it to a destination node. The first pass is for calculating a checksum and the second pass is for transmitting the packet over the network. Similarly, a reception pass and a checksumming pass are required at the destination. These are referred to as non-zero pass approaches to checksumming because an additional pass is required to perform the checksum calculation.

Although checksumming is sometimes computed in conjunction with another per-byte pass through the data, the checksumming pass cannot be combined with the transmission pass. Prevalently used end-to-end protocols require the checksum to be embedded within the packet header and the header is in transit before the checksum calculation is complete.

End-to-end checksumming can be implemented with a zero pass approach by adding a trailing field to each transport layer packet to contain the checksum, such as described in C. L. Williamson & D. R. Cheriton, *An Overview of the VMTP Transport Protocol*, Proc. of 14th Conf. on Local Computer Networks, pp. 415–420, IEEE Press, 1989. This allows the checksum to be computed while the packet is being transmitted onto the media and appended at the correct position as the last bytes of the packet are transmitted. However, this approach is incompatible with most transport layer protocols which generally embed a checksum within a packet's transport layer header, not trailer.

Another zero pass approach can be based on the data fidelity provided by the link layer cyclic redundancy code (CRC) scheme which will provide limited end-to-end reliability within the domain of the data link layer network. However, this approach limits the packet protection boundary to network domains wherein the source and destination nodes are strictly on the same network.

Therefore, what is needed is logic and a method for performing end-to-end embedded checksumming using a zero-pass approach that does not require the use of a transport layer checksum trailer field and that is network domain independent. As used throughout this document, the term "zero pass checksum" refers to a checksumming approach wherein no distinct per-byte read or write operation is required to compute a packet checksum. Such an approach: (1) should include a technique to compute an embedded end-to-end checksum with zero passes through each packet, and (2) should preferably also include one or more techniques that facilitate efficient per-packet operations for manipulating, inserting or locating the checksum field in each packet's header.

SUMMARY OF THE INVENTION

The present invention enables the above problems to be overcome by providing a method and network interface logic for providing embedded checksums with zero passes through each packet. A packet is transmitted directly onto a network from a source node. At this point, the end-to-end checksum field is set to a predefined value. An end-to-end checksum is calculated and embedded into the packet by a receiving store-and-forward node (e.g., an IP router) on the same directly-attached network (e.g., a Local Area Network) prior to forwarding the packet to its ultimate destination node.

An embodiment of the present invention is a method and network interface logic for providing an embedded checksum in a packet transferred over a packet network. The packet network comprises a plurality of interconnected, directly-attached computers operative to provide data fidelity between any neighboring pair of such computers at least as robust as such data fidelity between any non-neighboring pair of such computers. Each computer comprises packet storage means and network interface means. Such a packet is sent directly onto the packet network from the packet storage means of a source computer using its network interface means. The packet is received from the packet network and transferred directly into the packet storage means of a sibling computer using its network interface means. Such an embedded checksum is associated with the packet and is embedded at the sibling computer with the embedded checksum being calculated by at least one of the source computer or the sibling computer based on substantially the entire packet for validating error-free receipt.

A further embodiment of the present invention is a method and network interface logic for providing an embedded checksum through postponed checksum calculation in a packet transferred over a packet network. The packet network comprises a plurality of interconnected, directly-attached computers operative to provide data fidelity between any neighboring pair of such computers at least as robust as such data fidelity between any non-neighboring pair of such computers. The packet comprises a header for storing the embedded checksum and a payload for storing the data being transferred. Each computer comprises a main memory and network interface logic. The header without such an embedded checksum and the payload are transmitted from the main memory of the source computer directly onto the packet network using the network interface logic of the source computer. The header and the payload are received from the packet network and the payload is transferred directly into the main memory of the sibling computer using the network interface logic of a sibling computer. The checksum is accumulated with a checksum register in the network interface logic of the sibling computer as the packet is received from the packet network and the accumulated checksum is embedded from the checksum register into the header.

A still further embodiment of the present invention is a method and network interface logic for providing an embedded checksum in a packet network. The packet network comprises a plurality of directly-attached computers operative to provide data fidelity between any neighboring pair of such computers at least as robust as such data fidelity between any non-neighboring pair of such computers. Each computer comprises a plurality of buffers for packet storage and network interface means for network interconnection. A packet is converted using the network interface means on a source computer into a set of signals as the packet is read directly from one of the plurality of storage buffers on the source computer. The set of signals is sent using the network interface means on the source computer onto the packet network. The set of signals is received using the network interface means on a sibling computer from the packet network. The set of signals is converted using the network interface means on the sibling computer back into the packet and transferring the packet directly into one of the plurality of storage buffers on the sibling computer. An end-to-end checksum is accumulated using the network interface means on the sibling computer during packet receipt.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 7A and 7B is a block diagram illustrating an approach to providing an embedded checksum using postponed calculation according to the present invention;

FIGS. 10A and 10B is a block diagram illustrating an approach to providing an embedded checksum using postponed insertion according to the present invention.

DETAILED DESCRIPTION

I. Networking Environment

Figure 1:
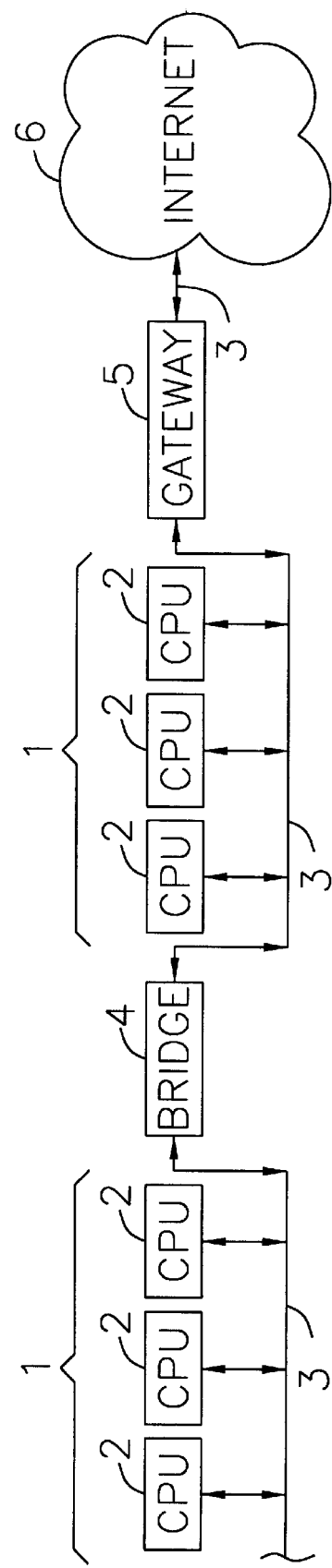
FIG. 1 is an overall block diagram of a packet-switched network which may be utilized according to the present invention.

A network 1 constructed in accordance with the present invention is shown in FIG. 1. The components of the network 1 include network interfaces (not shown) installed at each of the computers 2 and the network media 3. The network media can include special purpose computing components (not shown) serving as media-level switches. Local Area Network (LAN) technologies such as Ethernet and Myrinet are examples of such networks, such as disclosed in N. J. Boden et al., *Myrinet: A Gigabit-Per-Second Local Area Network*, IEEE Micro, pp. 29–36 (Feb. 19, 1995), the disclosure which is incorporated herein by reference, although the construction of a network 1 is not strictly limited to "local area" technologies. Technologies suitable for wide area networks (e.g., ATM) are also exemplary of a network 1.

Additional components are required to interconnect individual networks. A bridge 4 interconnects homogeneous networks, but does not perform internet protocol (IP) layer processing. A link layer gateway (not shown) interconnects heterogeneous networks, but does not perform IP layer processing. This type of gateway is capable of directly converting between different network technologies without using IP layer information. An IP layer gateway 5, sometimes termed an IP router, interconnects heterogeneous networks, such as to the internet 6, and processes and forwards IP packets regardless of the underlying link layer protocols or physical media employed. The link and IP layer protocols are described further hereinbelow in FIG. 2.

Figure 2:
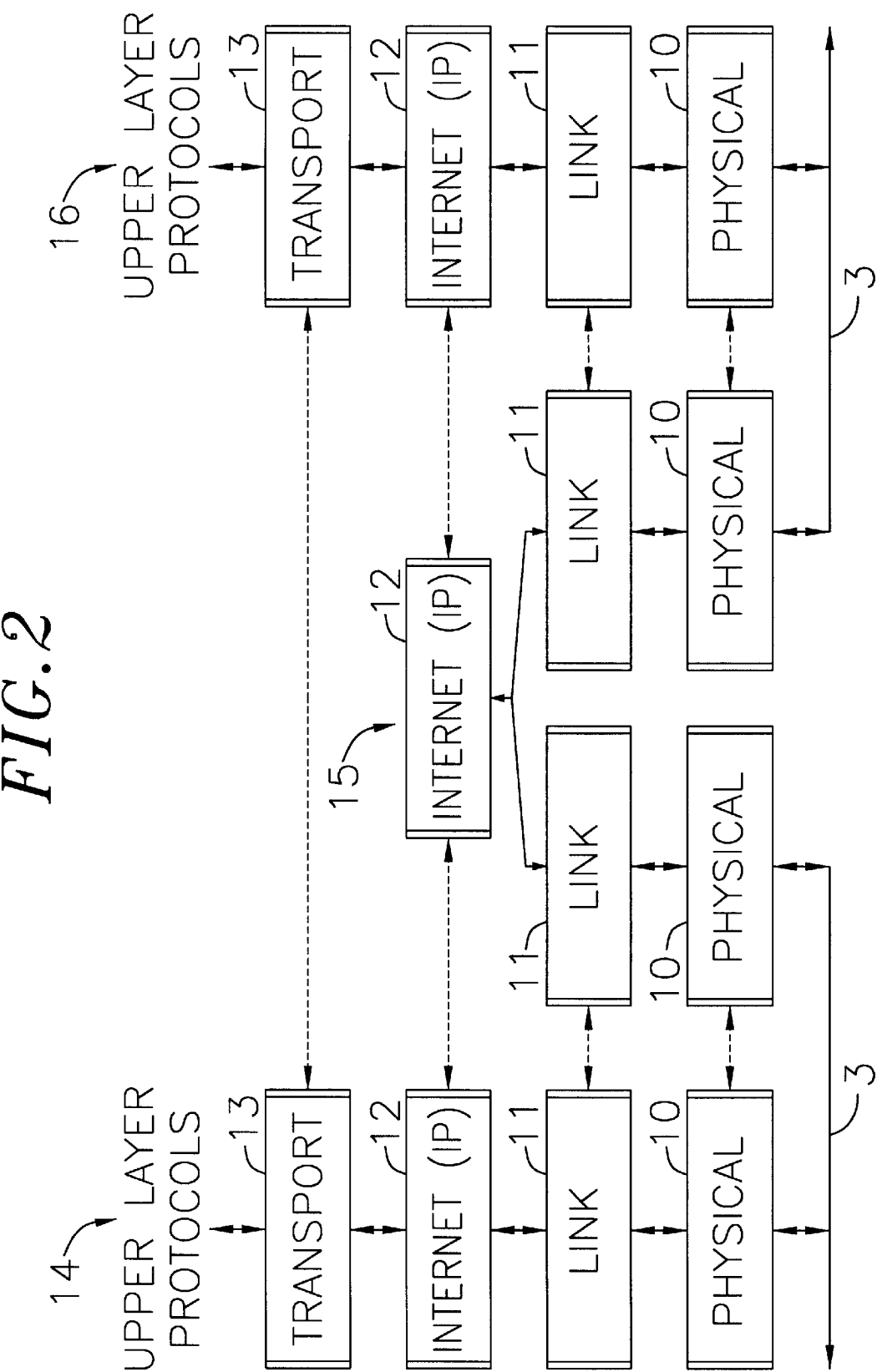
FIG. 2 is a diagram illustrating the four lower-most layers of the ISO Reference Model.

A functional block diagram of a source node 14, an intermediate node 15 and a destination node 16 is shown in FIG. 2. These nodes are interconnected by media 3 and are organized into individual protocol stacks. Source node 14 and destination node 16 both have protocol stacks comprising processes for the transport 13, network 12 (e.g. IP), link 11 and physical layers 10. Intermediate node 15 has a protocol stack comprising processes for the network (IP), link and physical layers. The physical protocol layer 10 and link protocol layer 11 are structured in accordance with the ISO Reference Model such as described in Andrew S. Tanenbaum, *Computer Networks*, pp. 15–21, Prentice-Hall (1981), the subject of which is incorporated herein by reference. The network layer 12 is structured in accordance with the Internet Protocol such as described in J. Postel (ed.), *RFC 791: Internet Protocol*, the subject of which is incorporated herein by reference. The transport protocol layer 13 is structured in accordance with either the Transmission Control Protocol (TCP) or the User Datagram Protocol such as respectively described in J. Postel (ed.), *RFC 793: Transmission Control Protocol* and J. Postel (ed.), *RFC 768: User Datagram Protocol*, the subjects of which are incorporated herein by reference.

Embodiments of the present invention are described herein with respect to the prevalent TCP/IP (version 4) protocol suite. However, this invention is equally applicable to other protocol suites with similar functionality, for example, the less common ISO OSI suite and the next generation TCP/IP (version 6) suite.

The present invention is applied within a network 1 and provides a method to compute and insert an end-to-end checksum into a data packet such that a receiving node, in the same or another network, can determine data fidelity. End-to-end checksum functionality is described further hereinbelow in Section II. This method is compatible with, and transparent to, other methods that can be used by a destination node to validate the checksum.

II. End-to-End Checksum Functionality

End-to-end checksums are used by the transport layer 13 and the network layer 12 to ensure a reliable link between the source node 14 and the destination node 16. The need for an end-to-end checksum is particularly important when a packet is being transmitted from a source computer through one or more bridges or gateways to another computer situated external to the immediate network. A checksum is calculated at some point prior to the packet transmission process and inserted into a packet header. Upon receipt, the checksum is validated to detect whether errors were encountered between the peer transport layer 13 (or IP layer 12) processes arising from hardware or software malfunctions or transmission errors.

Figure 3:
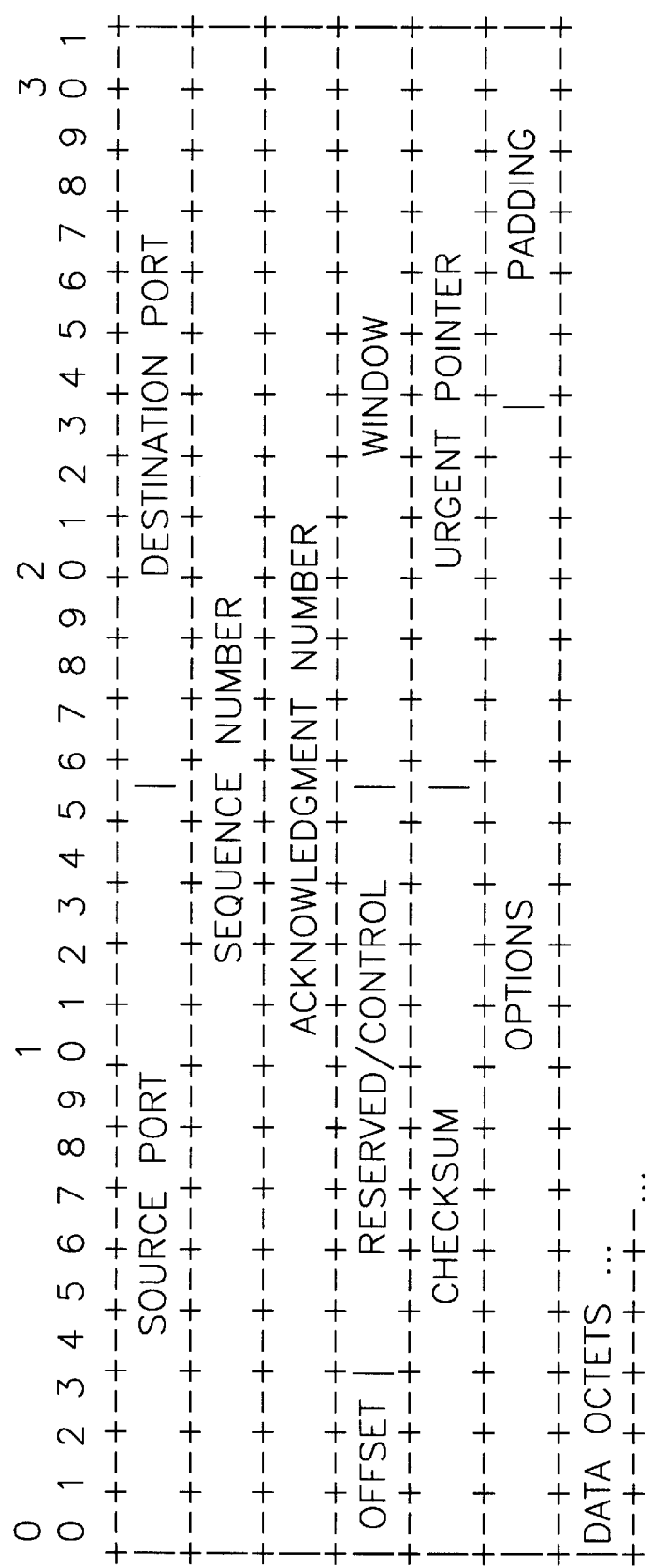
FIG. 3 is a data structure depicting a Transmission Control Protocol packet header format.
Figure 4:
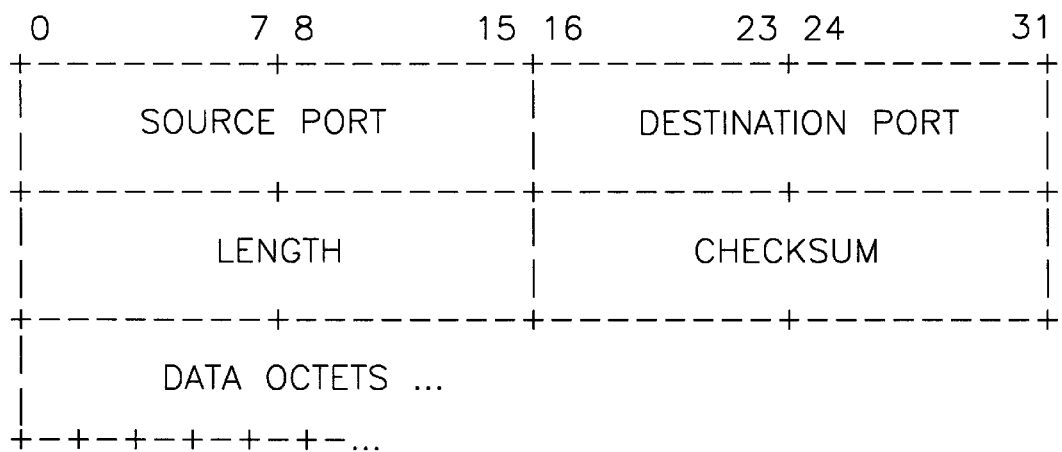
FIG. 4 is a data structure depicting a User Datagram Protocol packet header format.
Figure 5:
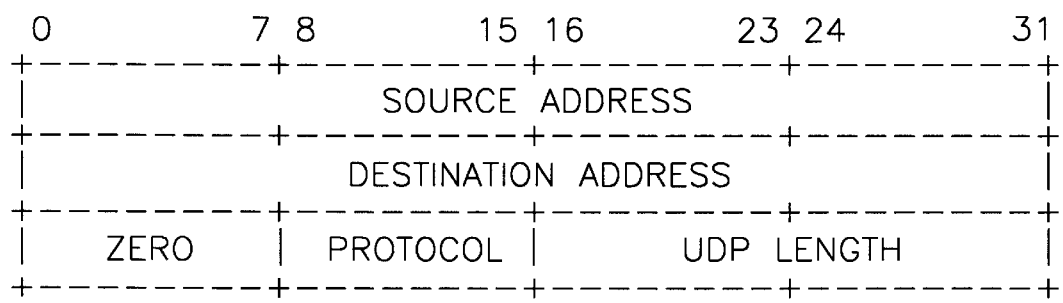
FIG. 5 is a data structure depicting a User Datagram Protocol pseudo packet header format.

Generally, an end-to-end checksum is stored in a checksum field in the packet's header along with other protocol control and status information. The structure of the header varies according to the particular protocol employed. For instance, a data structure depicting the format of a TCP header as used in the transport layer 13 is shown in FIG. 3. Alternatively, data structures depicting the formats of a UDP header and a UDP pseudo header as used in the transport layer 13 are shown in FIGS. 4 and 5.

Referring back to FIG. 2, a packet will only pass through chained lower layer processes of the IP 12, link 11 and physical 10 layers while traveling between the peer transport layer 13 processes of the source node 14 and destination node 16. Absent an end-to-end checksum or similar methodology, the only assurance of error-free transmission is that provided by the lower layer processes and, in particular, the link layer 11. However, each separate network or subnet might not provide the same level of error protection as that provided by the lower layer processes of the source network.

This introduces the possibility of errors occurring as a result of a dysfunctional intermediate node 15. For example, a packet sent from the source node 14 might be properly received by the intermediate node 15, yet have an error introduced due to some malfunction occurring within the intermediate node 15 itself. Nevertheless, the packet would still be properly received by the destination node 16 despite the error. In effect, the error would be undetectable by the IP, link or physical layers since these layers only ensure error-free packet transmission between neighboring nodes, that is, between nodes 14 and 15 or between nodes 15 and 16, and not between end-to-end nodes, that is, between nodes 14 and 16. An end-to-end checksum therefore enables the transport 13 (or network 12) layer processes at the source node 14 and the destination node 16 to detect an error caused by the intermediate node 15.

Although the network layer 12 can provide end-to-end data fidelity, and does so in some protocol stacks, this is not generally the case. In the prevalent TCP/IP protocol suite, the IP layer 12 performs node-by-node routing functionality and leaves end-to-end fidelity to be guaranteed by the transport layer 13. The present invention is described in terms of transport layer 13 fidelity, although it is equally applicable to the use of a checksum by either the network 12 or transport layers 13 for providing end-to-end fidelity.

III. Prior Art Techniques

Figure 6A:
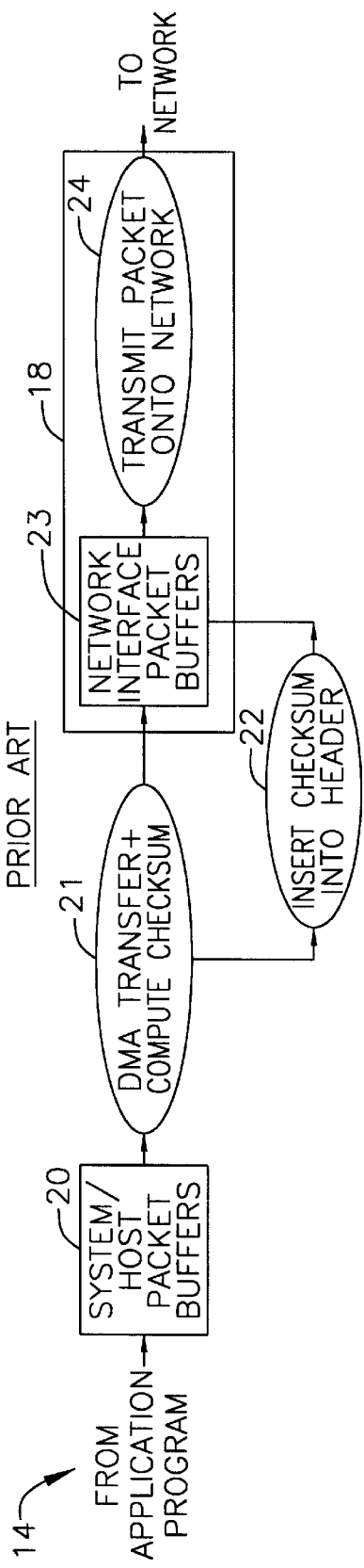
FIGS. 6A and 6B is a block diagram illustrating a prior art approach to checksum calculation.
Figure 6B:
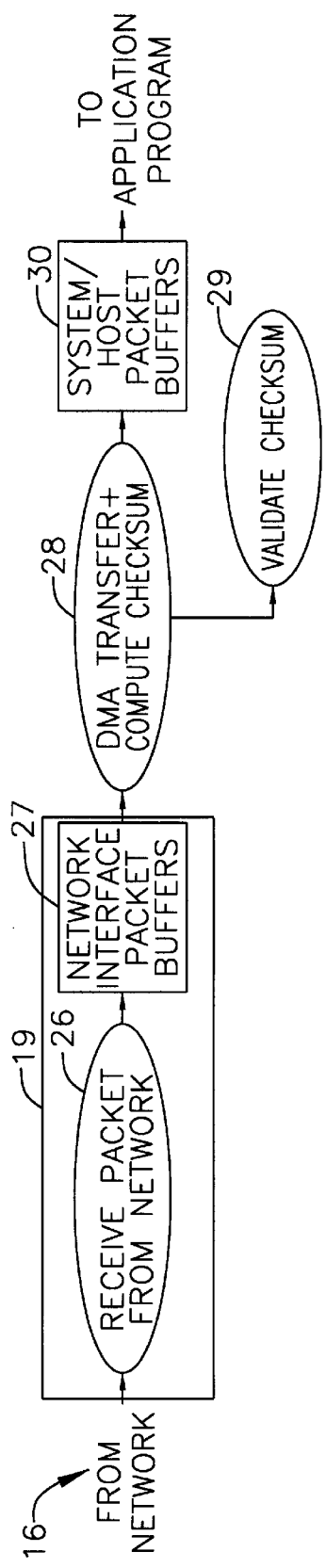

A prior art end-to-end checksumming approach using a source network interface 18 and a destination network interface 19 is shown in FIGS. 6A and 6B. A packet originates from source node protocol stack 14 and is transmitted over the network to a destination node protocol stack 16. An application program (not shown) stores the packet into a plurality of host packet buffers in system memory (block 20) which can be a bank of packet registers or part of main memory. To minimize processor overhead, direct memory access (DMA) asynchronously transfers the packet from the host packet buffers to an interface packet buffer (block 23) located on the source network interface 18. Checksum calculation is performed in conjunction with the DMA transfer using an accumulator incorporated into the DMA circuitry (block 21). Thus, upon completion of the transfer, a checksum will have been accumulated over the entire packet which will then be inserted into the packet header stored in the interface packet buffer (block 22). The source network interface 18 can then transmit the packet onto the network (not shown) from the interface packet buffer (block 24).

At the destination node protocol stack 16, the reverse sequence of steps is followed. The destination network interface 19 receives the packet from the network (block 26) and stores it in an interface packet buffer (block 27). A DMA transfer of the packet from the interface packet buffer to a host packet buffer is performed while simultaneously accumulating a checksum (block 28). Upon completion of the transfer, the received packet will be stored in the host packet buffer (block 30) and a checksum will have been accumulated for validating the error-free receipt of the packet (block 29).

Although this prior art approach combines the checksum calculation with another per-byte operation, a data copy, it nevertheless requires each packet to be scanned in its entirety before embedding a checksum into the packet prior to dispatch from the source node protocol stack 14. As well, upon receipt by the destination node protocol stack 16, the packet must again be scanned in its entirety to calculate a checksum for validation. A problem with this and other similar approaches is that a pre-dispatch end-to-end checksum calculation must always be performed at the source node protocol stack 14.

IV. Present Invention Approach Using Postponed Calculation

An approach to provide an embedded checksum according to a preferred embodiment of the present invention using postponed calculation is shown in FIGS. 7A and 7B. The unnecessary pre-dispatch checksum calculation (block 21 in FIG. 6A) is eliminated in the source node protocol stack 14. Instead, the application program stores the packet into the host packet buffer (block 20) and the packet is directly transmitted onto the network by the source network interface 30 without performing checksumming (block 24). Calculation of the end-to-end checksum is postponed until the packet is received by a sibling node protocol stack 17 which could be an intermediate node 15 or a destination node 16. It is critical that the sibling node 17 be situated on the same directly-attached network (e.g., a LAN) to exploit the data fidelity guaranteed by the network as further described hereinbelow.

Upon receipt at the sibling node protocol stack 17, the packet is directly transferred into a host packet buffer 30 without being transiently stored in an interface packet buffer (block 33). The input channel logic (not shown) of the sibling network interface 31 incorporates an accumulator to calculate checksums as the packet is being received from the network media 3. The checksum is stored into a register (not shown) for use by the upper layer protocols. Thus, by the time that the entire packet is stored into the host packet buffer (block 30), the checksum will have been calculated with no additional passes through the packet. If the packet does not already contain a checksum (block 34), the checksum will be inserted into the packet (block 22). Otherwise, the checksum can be used to validate error-free packet receipt (block 29).

The deferred computation 33 of the end-to-end checksum is transparent to the destination node 16 in that the destination node 16 is unaware of the insertion of the checksum by a node other than the source node 14. By removing the requirement that a checksum be calculated prior to dispatch from the source node 14, the performance penalty associated with the conventional scan-before-dispatch checksum calculation approach is eliminated. This is possible because it is unnecessary to calculate an end-to-end checksum at the source node 14 prior to packet dispatch when the link layer 11 provides a level of packet fidelity within the source network that is sufficient for the upper layer (transport 13 and IP 12) protocols themselves.

The need to detect errors incurred in the lower layer (link 11 and physical 10) protocols sharply decreases when a packet is transmitted within a single directly-attached network. There are fewer points for the introduction of errors in this limited domain and link-layer protocols can guarantee some degree of data fidelity between directly-attached computers. If the error protection provided by the link layer 11 is equal to or greater than that provided by the upper layers 12 and 13, an end-to-end checksum need not be calculated prior to dispatch of the packet from the source node 14. Instead, an end-to-end checksum can be accumulated and embedded into the packet at a sibling node 17 located on the same network, and preferably at the source node's immediate neighbor (the packet's first network-level hop).

Deferred end-to-end checksum calculation is possible because, once sent, a packet can be guaranteed to be received correctly by the next node on the same high fidelity network. The link layer 11 ensures that the packet will be received by the next node on the same network error-free.

A further approach to provide an embedded checksum according to a further embodiment of the present invention using postponed insertion performed outside the IP layer is further described hereinbelow in Section VI. In the further approach, a checksum is accumulated during dispatch, tacked onto the packet as a trailer and inserted into the packet upon receipt.

Figure 8:
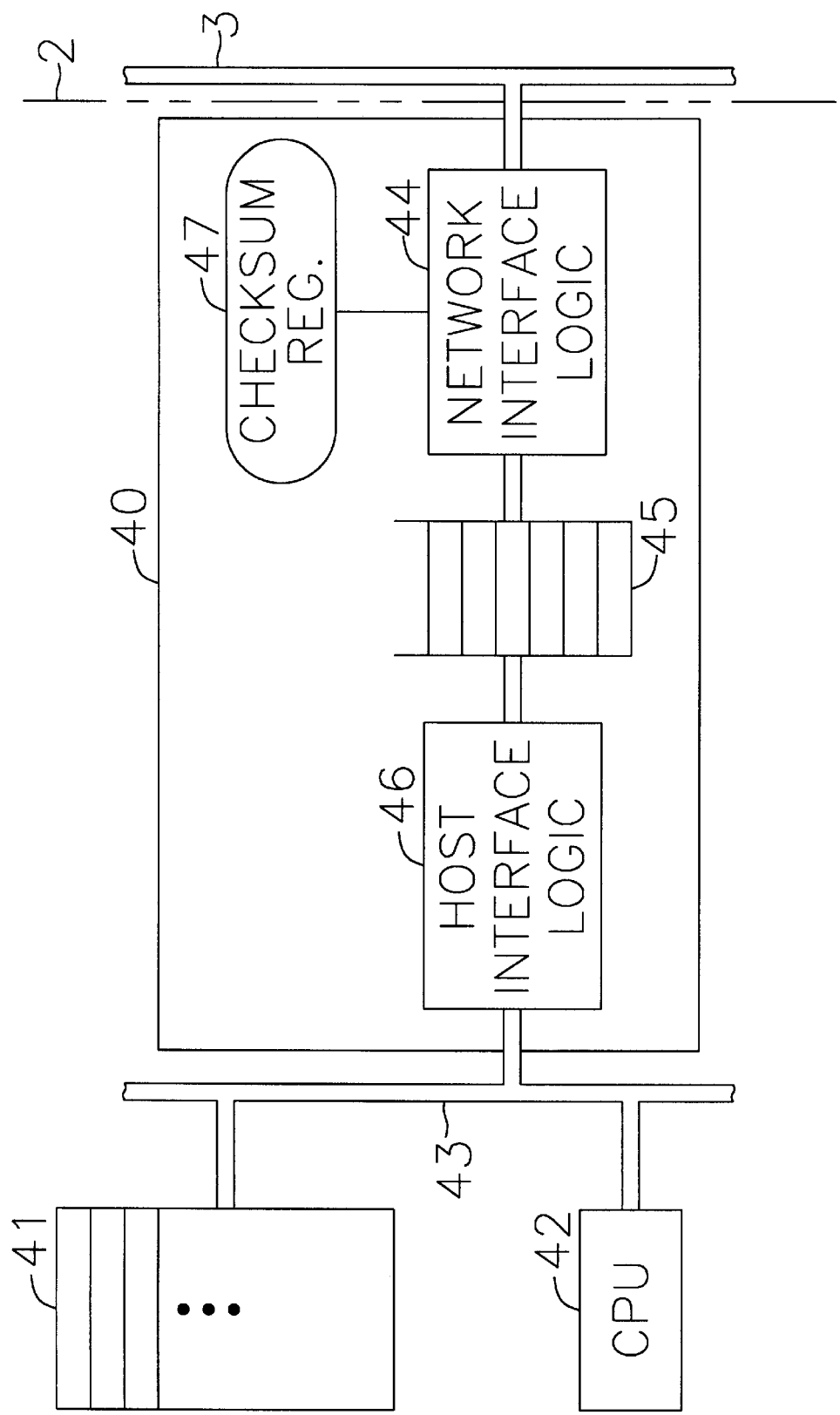
FIG. 8 is a functional block diagram of a network interface according to the present invention.

A functional block diagram of a network interface constructed in accordance with the present invention is shown in FIG. 8. Network interface 40 interfaces the computer system 2 to the network over media 3. Packets are exchanged directly between the network interface 40 and the main memory 41 which comprises a plurality of system packet buffers. A CPU 42 directly exchanges packets with the main memory 41. The network interface 40, the main memory 41 and the CPU 42 are interconnected by a system bus 43.

The network interface 40 comprises four primary functional components. Network interface logic 44 comprises input channel logic (not shown) which directly interfaces to media 3 and performs those functions roughly analogous to the physical layer 10. During the receipt of a packet, a checksum is accumulated by network interface logic 44 and stored in a checksum register 47. A bit serial First-In/First-Out (FIFO) buffer 45 enables the network interface logic 44 to send and receive packets in an uninterrupted manner. Host interface logic 46 operates analogously to DMA logic but does not store packets transferred in from main memory 41. Instead, the FIFO buffer 45 enables the bit serial exchange of packets between the main memory system packet buffers 41 and the network interface 40 without the necessity of transient interface packet buffers.

V. Techniques for Required Per-Packet Functionality

In addition to the deferred end-to-end checksum computation 33, the sibling node protocol stack 17 must be able to perform two per-packet functions to determine how the checksum is to be applied. It must be able to determine if a checksum is present in the received packet and it must be able to determine the location of the checksum field.

There are several methods to determine if a checksum is present. Three exemplary methods are as follows. First, an indicator flag can be employed as part of the link layer header, such as in the described embodiment as further described hereinbelow in FIG. 9. Second, the sibling node 17 can use the packet's source address and a priori knowledge of the network configuration. Hosts on the directly-attached network can be listed in a lookup table accessed by sibling node 17. The lookup table indicates whether the packet sent from the listed host has a checksum inserted. Packets originating at hosts not on the directly-attached network will already have a checksum. Third, the sibling node 17 can examine the IP or transport headers (e.g., the checksum field) to determine if a checksum is present. This, however, requires that the checksum field location be known. Other ways of determining whether a checksum is present are envisioned.

There are several methods to determine the checksum field location. Two exemplary methods are as follows. First, an offset field in the link header can be used to indicate the relative location of the end-to-end checksum, such as in the described embodiment as further described hereinbelow in FIG. 9. Second, a protocol specific approach can be employed that specifically dictates the checksum location within a packet. The problems with this approach are distinguishing between fixed length and variable length headers and the costs associated with the protocol header processing required to determine the particular protocol employed. Other ways of determining checksum location are envisioned.

Figure 9:
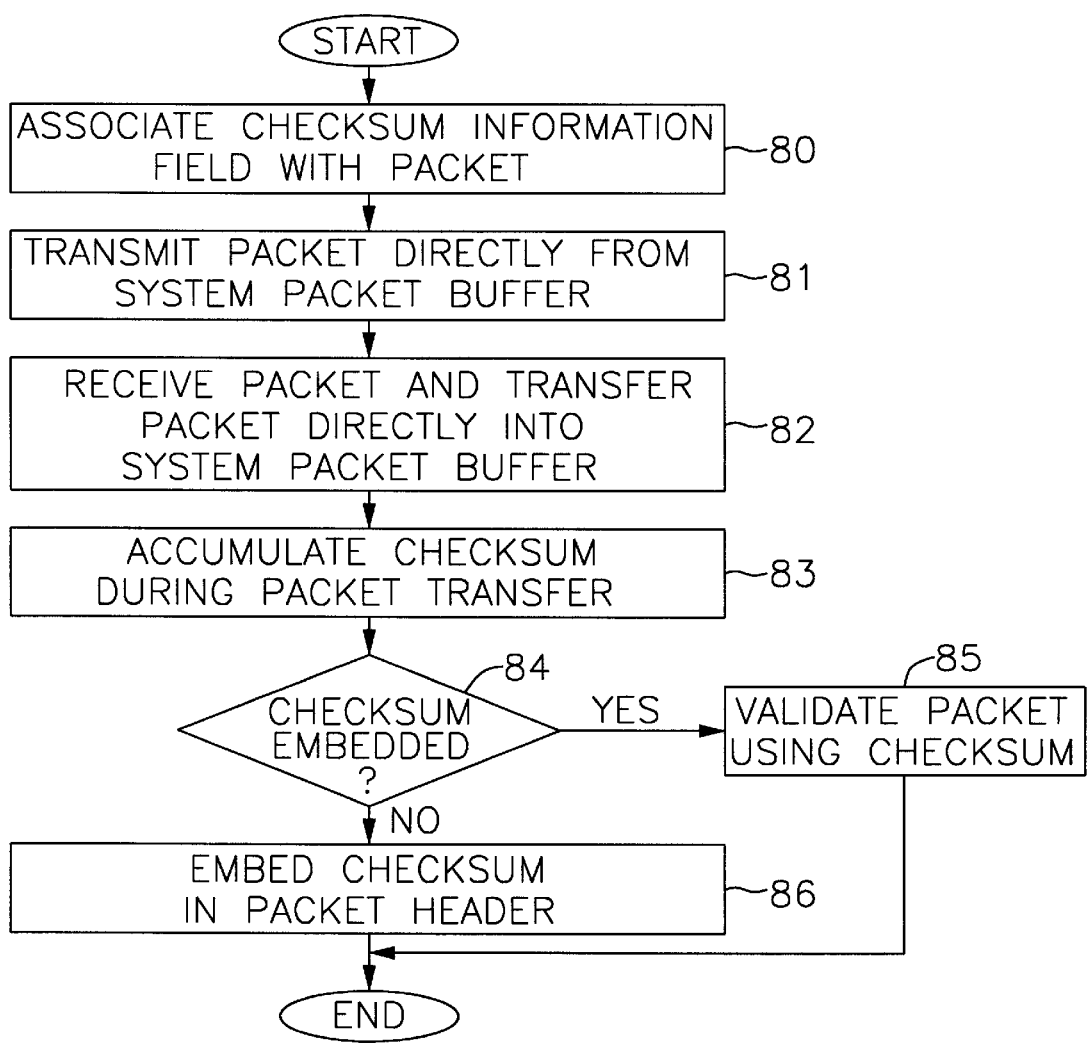
FIG. 9 is a flow chart illustrating the calculation of an internet protocol checksum using postponed calculation.

A zero-pass method embodying the present invention for calculating and inserting embedded end-to-end checksums for use by upper layer protocols to ensure error-free packet transmission with no additional per-byte overhead costs at the source node is shown in FIG. 9.

The link layer 11 in source node 14 associates a checksum information field {I, Offset} with each outgoing packet wherein {I} is a flag indicating whether a checksum has been inserted and {Offset} is a pointer pointing to the end-to-end checksum field location within the packet's header (block 80). Thus, in the described embodiment, the two requirements of determining whether a checksum is present and, if so, where it is located, are satisfied. The link layer 11 can also use other equally acceptable methods to determine per-packet checksum information.

The packet is transmitted from the source node 14 directly from its system packet buffer 41 to a first-hop sibling node 17 on the same network (block 81). The packet is received by the sibling node 17 and transferred directly into the system packet buffer 41 (block 82) using network interface logic 44. The end-to-end checksum is accumulated during the packet transfer (block 83) and computed in a manner conventional in the art, such as described in R. Braden et al., *RFC*1071: *Computing the Internet Checksum*, the subject of which is incorporated herein by reference.

The network interface logic 44 determines whether a checksum has been embedded into the received packet by examining the {I} flag (block 84). If a checksum has not been embedded, the network interface logic 44 retrieves the checksum from the checksum register 47 and embeds the checksum into the packet's header at the location pointed to by the {Offset} pointer (block 86). Otherwise, the CPU 42 validates the packet using the checksum as conventional in the art (block 85).

A further embodiment of the present invention obviates the need for a checksum indication field {I}. In this embodiment, every machine connected to a LAN implements zero-pass checksumming in accordance with the present invention. A gateway 5 connected to such a LAN treats any packet received over the LAN that is destined for a node outside the LAN as not having a checksum inserted. The gateway 5 uses its network interface logic 44 to calculate and insert an end-to-end checksum prior to forwarding the packet outside the LAN. Likewise, any sibling node 17 located within the LAN that receives a packet not sent by a gateway 5 treats the packet in a like manner and calculates and inserts an end-to-end checksum. Thus, when such a node receives a packet from either a gateway or another node, the checksum can be validated in the same manner.

With this further method, the network source and destination addresses in the packet themselves act as an indicator flag in lieu of the {I} flag contained in the checksum information field. The gateway or the sibling node 17 examines the address of the source node that sent the packet. If the source address lies inside the local network, the gateway 5 or the sibling node 17 calculates and inserts a checksum. Otherwise the packet is treated as a standard IP packet.

VI. Present Invention Approach Using Postponed Insertion

A further approach to provide an embedded checksum according to a further embodiment of the present invention using postponed insertion is shown in FIGS. 10A and 10B. The unnecessary post-receipt checksum calculation (block 28 in FIG. 6B) is eliminated in the destination node protocol stack 16. Instead, the application program stores the packet into the host packet buffer (block 20) and the packet is directly transmitted onto the network by the source network interface 90 while a checksum is accumulated (block 91). The checksum is tacked onto the packet as a trailer by a protocol process operating outside the IP layer 12. Insertion of the end-to-end checksum is postponed until the packet is received by a sibling node protocol stack 17 which could be an intermediate node 15 or a destination node 16 and the end-to-end checksum is retrieved from the trailer. It is critical that the sibling node 17 be situated on the same directly-attached network (e.g., a LAN) to maintain network domain independence.

Upon receipt at the sibling node protocol stack 17, the sibling network interface 92 receives the packet from the network (block 26) and the packet is directly transferred into a host packet buffer 30 without being transiently stored in an interface packet buffer (block 33). If the packet does not already contain an embedded checksum (block 93), the checksum in the packet's trailer will be inserted into the packet (block 22). Otherwise, the embedded checksum can be used to validate error-free packet receipt (block 29).

The deferred insertion 22 of the end-to-end checksum is transparent to the destination node 16 in that the destination node 16 is unaware of the insertion of the checksum by a node other than the source node 14. By removing the requirement that a checksum be embedded prior to dispatch from the source node 14, the performance penalty associated with the conventional scan-before-dispatch checksum calculation approach is eliminated.

Figure 11:
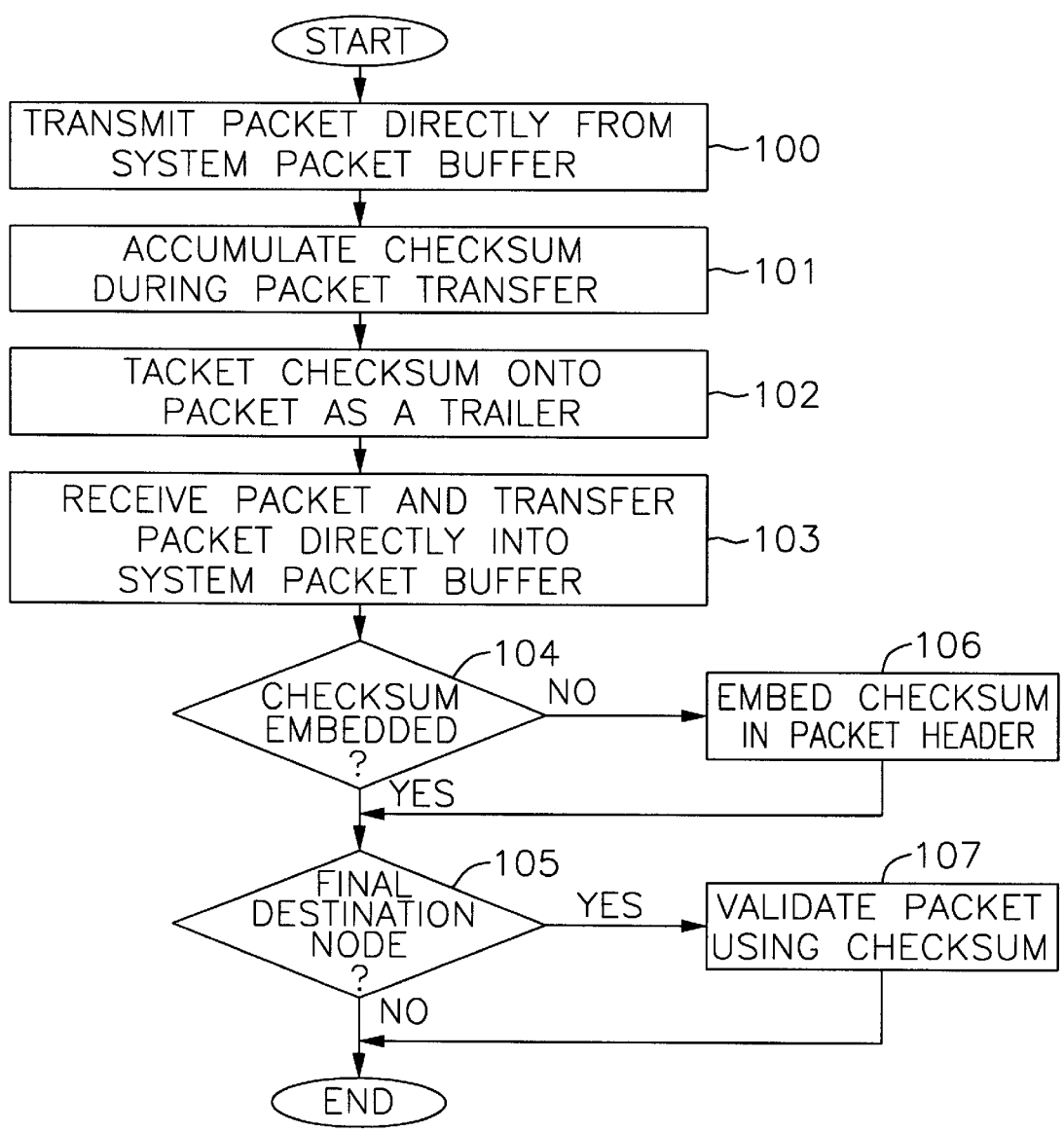
FIG. 11 is a flow chart illustrating the calculation of an internet protocol checksum using postponed insertion.

A further zero-pass method embodying the present invention for calculating and inserting embedded end-to-end checksums for use by upper layer protocols to ensure error-free packet transmission with no additional per-byte overhead costs at the source node is shown in FIG. 11.

A packet is transmitted from the source node 14 directly from its system packet buffer 41 to a first-hop sibling node 17 on the same network (block 100). A checksum is accumulated during the packet transfer (block 101) and computed in a manner conventional in the art, such as described in R. Braden et al., *RFC*1071: *Computing the Internet Checksum*, the subject of which is incorporated herein by reference, and tacked onto the packet as a trailer (block 102). The packet is received by the sibling node 17 and transferred directly into the system packet buffer 41 (block 103) using the network interface logic 44.

The network interface logic 44 determines whether a checksum has been embedded into the received packet, for instance, by examining an {I} flag as described hereinabove in FIG. 9. If a checksum has not been embedded (block 104), the network interface logic 44 retrieves the checksum from the packet trailer and embeds the checksum into the packet's header, for instance, at the location pointed to by the {Offset} pointer as described hereinabove in FIG. 9 (block 106). Finally, if the packet has arrived at its final destination node (block 105), the CPU 42 validates the packet using the checksum as conventional in the art (block 107).

VII. Link-Level Bridges, Gateways, and Routers

The descriptions of previous embodiments of the present invention were in the context of LANs interconnected by network-level gateways (e.g., IP routers). In further embodiments, the invention can be applied with interconnected homogeneous LANs using a link-level bridge, or with interconnected heterogeneous LANs using a link-level gateway. In yet further embodiments, the directly-attached network that connects a source node and the sibling computer can be a wide-area technology rather than a local-area network (LAN).

Still further embodiments within the spirit of the present invention would be equally acceptable so long as the following two conditions are met. First, it is critical that data fidelity be guaranteed along the path from the source node up to and including the point of checksum accumulation, that is, at the sibling node that calculates the checksum. In the described embodiment, data fidelity is guaranteed by the link-level CRC. If data fidelity is not guaranteed, the checksum may be correctly computed and embedded into an already corrupted packet. Second, each node that might be required to serve as a sibling where the checksum calculation and insertion is performed must be a store-and-forward type of node. A store-and-forward node is required so that the header checksum field will be available for checksum insertion. In the case of a cut-through node, for example, the checksum field could already be in transit before the checksum is calculated.

While the invention has been particularly shown and described as referenced to the embodiment thereof, it will be understood by those skilled in the art that the foregoing in other changes in form and detail may be made therein without departing from the spirit and scope of the invention.

What is claimed is:

1. A method using a computer for providing an embedded checksum in a packet transferred over a packet network, the packet network comprising a plurality of interconnected, directly-attached computers operative to provide data fidelity between any neighboring pair of such computers at least as robust as such data fidelity between any non-neighboring pair of such computers, each computer comprising packet storage means and network interface means, comprising the steps of:

(a) sending such a packet directly onto the packet network from the packet storage means of a source computer using its network interface means;

(b) receiving the packet from the packet network and transferring the packet directly into the packet storage means of a sibling computer using its network interface means; and (c) associating such an embedded checksum with the packet at the sibling computer with the embedded checksum being calculated by at least one of the source computer or the sibling computer based on substantially the entire packet for validating error-free receipt.

2. A method according to claim 1, further comprising the steps of:

(d) sending the packet by transmitting the packet without the embedded checksum onto the network; and (e) associating the embedded checksum with the packet by accumulating a checksum using the network interface means of the sibling computer as the packet is received from the packet network and embedding the accumulated checksum into the packet using the sibling computer.

3. A method according to claim 2, further comprising the step of:

(f) associating a checksum information field with the packet prior to step (a) for indicating if such an embedded checksum is present in the packet and for pointing to a location for storing such an embedded checksum within the packet.

4. A method according to claim 3, wherein the checksum information field comprises an indicator flag, further comprising the step of:

(g) setting the indicator flag to indicate that the embedded checksum is initially not present prior to step (a); and (h) setting the indicator flag to indicate that the embedded checksum is present subsequent to step (e).

5. A method according to claim 3, wherein the checksum information field comprises an offset field, further comprising the step of:

(g) setting the offset field to point to the location for storing such an embedded checksum within the packet; and (h) storing the accumulated checksum in the location pointed to by the offset field.

6. A method according to claim 2, further comprising the step of:

(f) validating error-free receipt of the packet by the sibling computer using its network interface means to compare the accumulated checksum to the embedded checksum whenever such an embedded checksum is already present in the packet prior to step (b).

7. A method according to claim 2, further comprising the steps of:

(f) repeating steps (d) and (b) so long as each such sibling node is directly-attached and in the packet network whereby checksum calculation is postponed.

8. A method according to claim 1, further comprising the steps of:

(d) sending the packet by transmitting the packet onto the packet network while accumulating a checksum using the network interface means of the source computer as the packet is transmitted; and (e) associating the embedded checksum by embedding the accumulated checksum into the packet after the packet is received from the packet network by the sibling computer.

9. A method according to claim 8, further comprising the steps of:

(f) tacking the accumulated checksum onto the packet as a trailer subsequent to step (d); and (g) receiving the trailer from the packet network along with the packet and retrieving the accumulated checksum from the trailer for embedding into the packet by the sibling computer.

10. A method according to claim 9, further comprising the step of:

(h) validating error-free receipt of the packet by the sibling computer using its network interface means to compare the accumulated checksum to the embedded checksum whenever the sibling computer is a final destination for the packet.

11. A method according to claim 8, further comprising the steps of:

(f) repeating steps (d) and (b) so long as each such sibling node is directly-attached and in the packet network whereby checksum insertion is postponed.

12. Network interface logic for providing an embedded checksum in a packet transferred over a packet network, the packet network comprising a plurality of interconnected, directly-attached computers operative to provide data fidelity between any neighboring pair of such computers at least as robust as such data fidelity between any non-neighboring pair of such computers, each computer comprising packet storage means and network interface means, comprising:

(a) means for sending such a packet directly onto the packet network from the packet storage means of a source computer using its network interface means;

(b) means for receiving the packet from the packet network and means for transferring the packet directly into the packet storage means of a sibling computer using its network interface means; and (c) means for associating such an embedded checksum with the packet at the sibling computer with the embedded checksum being calculated by at least one of the source computer or the sibling computer based on substantially the entire packet for validating error-free receipt.

13. A method using a computer for providing an embedded checksum through postponed checksum calculation in a packet transferred over a packet network, the packet network comprising a plurality of interconnected, directly-attached computers operative to provide data fidelity between any neighboring pair of such computers at least as robust as such data fidelity between any non-neighboring pair of such computers, the packet comprising a header for storing the embedded checksum and a payload for storing the data being transferred, each computer comprising a main memory and network interface logic, comprising the steps of:

(a) transmitting the header without such an embedded checksum and the payload from the main memory of the source computer directly onto the packet network using the network interface logic of the source computer;

(b) receiving the header and the payload from the packet network and transferring the payload directly into the main memory of the sibling computer using the network interface logic of a sibling computer; and (c) accumulating the checksum with a checksum register in the network interface logic of the sibling computer as the packet is received from the packet network and embedding the accumulated checksum from the checksum register into the header.

14. A method according to claim 13, wherein the packet further comprises a checksum information field for storing an indicator flag and an offset value, further comprising the steps of:

(d) setting the indicator flag to indicate that the header does not contain such an embedded checksum and setting the offset value to a location in the header for storing such an embedded checksum prior to step (a); and (e) storing the accumulated checksum in the location in the header pointed to by the offset field and setting the indicator flag to indicate that the header does contain the embedded checksum subsequent to step (c).

15. A method according to claim 13, further comprising the step of:

(d) validating error-free receipt of the packet by the sibling computer using its network interface logic to compare the accumulated checksum to the embedded checksum if such an embedded checksum is present in the header.

16. Network interface logic for providing an embedded checksum through postponed checksum calculation in a packet transferred over a packet network, the packet network comprising a plurality of interconnected, directly-attached computers operative to provide data fidelity between any neighboring pair of such computers at least as robust as such data fidelity between any non-neighboring pair of such computers, the packet comprising a header for storing the embedded checksum and a payload for storing the data being transferred, each computer comprising a main memory, comprising:

(a) a network interface logic in a source computer for transmitting the header without such an embedded checksum and the payload from the main memory of the source computer directly onto the packet network;

(b) a network interface logic in a sibling computer for receiving the header and the payload from the packet network and for transferring the payload directly into the main memory of the sibling computer; and (c) a checksum register in the network interface logic of the sibling computer for accumulating the checksum as the packet is received from the packet network, the network interface logic of the sibling computer embedding the accumulated checksum from the checksum register into the header.

17. A method using a computer for providing an embedded checksum in a packet network, the packet network comprising a plurality of directly-attached computers operative to provide data fidelity between any neighboring pair of such computers at least as robust as such data fidelity between any non-neighboring pair of such computers, each computer comprising a plurality of buffers for packet storages, network interface means for network interconnection, and processor means, the method comprising the steps of:

(a) converting a packet using the network interface means on a source computer into a set of signals as the packet is read directly from one of the plurality of storage buffers on the source computer;

(b) sending the set of signals using the network interface means on the source computer onto the packet network;

(c) receiving the set of signals using the network interface means on a sibling computer from the packet network;

(d) converting the set of signals using the network interface means on the sibling computer back into the packet and transferring the packet directly into one of the plurality of storage buffers on the sibling computer;

(e) accumulating an end-to-end checksum using the network interface means on the sibling computer during step (c);

(f) evaluating the packet using the network interface means on the sibling computer to determine whether the packet contains a checksum; and (g) embedding the checksum into the packet using the processor means on the sibling computer if the packet does not contain a checksum.

18. A method according to claim 17, further comprising the step of:

(h) validating the checksum using the processor means on the sibling computer if the packet contains a checksum.

* * * * *